(12) United States Patent
Liao et al.

(10) Patent No.: US 11,351,861 B2
(45) Date of Patent: Jun. 7, 2022

(54) DRIVER STATUS MONITOR TEST METHOD AND TEST SYSTEM

(71) Applicant: Automotive Research & Testing Center, Changhua County (TW)

(72) Inventors: Po-Hsiang Liao, Changhua County (TW); Yi-Cheng Chen, Changhua County (TW); Chun-Yao Shih, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 0 days.

(21) Appl. No.: 17/016,410

(22) Filed: Sep. 10, 2020

(65) Prior Publication Data

US 2022/0072953 A1    Mar. 10, 2022

(51) Int. Cl.
*G06V 20/59* (2022.01)
*B60K 28/06* (2006.01)
*B60W 50/14* (2020.01)

(52) U.S. Cl.
CPC .......... *B60K 28/066* (2013.01); *B60W 50/14* (2013.01); *G06V 20/597* (2022.01); *B60W 2050/143* (2013.01)

(58) Field of Classification Search
CPC ................ G06T 7/00; G06T 7/20; G06T 7/55
See application file for complete search history.

(56) References Cited

U.S. PATENT DOCUMENTS

| 10,083,233 | B2 * | 9/2018 | Kontschieder | ......... G06N 20/10 |
| 10,369,926 | B2 * | 8/2019 | Kim | ..................... A61B 5/1128 |
| 2020/0386992 | A1 * | 12/2020 | Wei | ........................... G06T 7/00 |

\* cited by examiner

*Primary Examiner* — Benyam Haile
(74) *Attorney, Agent, or Firm* — CKC & Partners Co., LLC

(57) ABSTRACT

A driver status monitor test method is for testing if a driver status monitor generates an alarm operation in accordance with driver motion images. A photographing unit of the driver status monitor is configured to take photographs of the driver motion images. The driver status monitor test method includes a test motion selecting step and a driver motion image displaying step. The test motion selecting step includes selecting at least one test motion for testing the driver status monitor by a user interface. The driver motion image displaying step includes displaying the driver motion images by a display. The driver motion images are a plurality of predetermined image frames in accordance with the test motion. The driver motion images include at least one of a face image, a forelimb image and a torso image.

20 Claims, 9 Drawing Sheets

100

DRIVER STATUS MONITOR TEST METHOD AND TEST SYSTEM

BACKGROUND

Technical Field

The present disclosure relates to a test method for a driver status monitor and a test system therefor. More particularly, the present disclosure relates to a test method for a driver status monitor equipped with a photographing unit and a test system therefor.

Description of Related Art

In recent years, more and more investigation reports have pointed out that a driver's distraction and fatigue are important causes of vehicle accidents. With the development of technology, the demand and production for the driver status monitors (DSMs) have been growing year by year, and the image recognition technique is more applied than the detecting technique in the driver status monitors. Thus, besides the verification requirements in the development phase of the driver status monitors, which are for recognizing the abnormal driving behaviors, some countries have also begun to establish test standards and regulation drafts for the driver status monitors.

However, the conventional test or verification for a driver status monitor often requires a lot of test manpower and test time, and it is difficult to improve the test consistency. Accordingly, there is an urgent need for a kind of test method and test system for the driver status monitors that can overcome the aforementioned problems to meet the requirements.

SUMMARY

According to one aspect of the present disclosure, a driver status monitor test method is for testing if a driver status monitor generates an alarm operation in accordance with driver motion images. A photographing unit of the driver status monitor is configured to take photographs of the driver motion images. The driver status monitor test method includes a test motion selecting step and a driver motion image displaying step. The test motion selecting step includes selecting at least one test motion for testing the driver status monitor by a user interface. The driver motion image displaying step includes displaying the driver motion images by a display. The driver motion images are a plurality of predetermined image frames in accordance with the test motion. The driver motion images include at least one of a face image, a forelimb image and a torso image.

According to another aspect of the present disclosure, a driver status monitor test system is for testing if a driver status monitor generates an alarm operation in accordance with driver motion images. A photographing unit of the driver status monitor is configured to take photographs of the driver motion images. The driver status monitor test system includes a user interface, a display, a processor and a nonvolatile memory. The processor is coupled to the user interface and the display. The nonvolatile memory is coupled to the processer and configured to provide a driver status monitor test module. The processor in accordance with the driver status monitor test module is configured to select at least one test motion for testing the driver status monitor by the user interface, and display the driver motion images by the display. The driver motion images are a plurality of predetermined image frames in accordance with the test motion. The driver motion images include at least one of a face image, a forelimb image and a torso image.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiments, the practical details is unnecessary. In addition, for simplifying the drawings, some conventional structures and elements will be simply illustrated, and repeated elements may be represented by the same labels.

Figure 1:
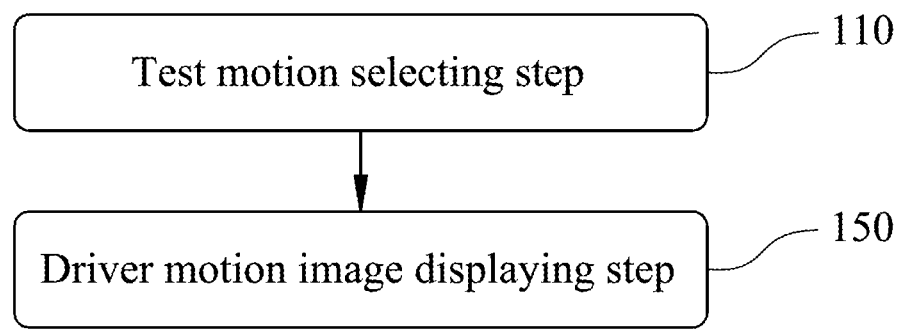
FIG. 1 is a flow chart of a driver status monitor test method according to the 1st embodiment of the present disclosure.
Figure 2A:
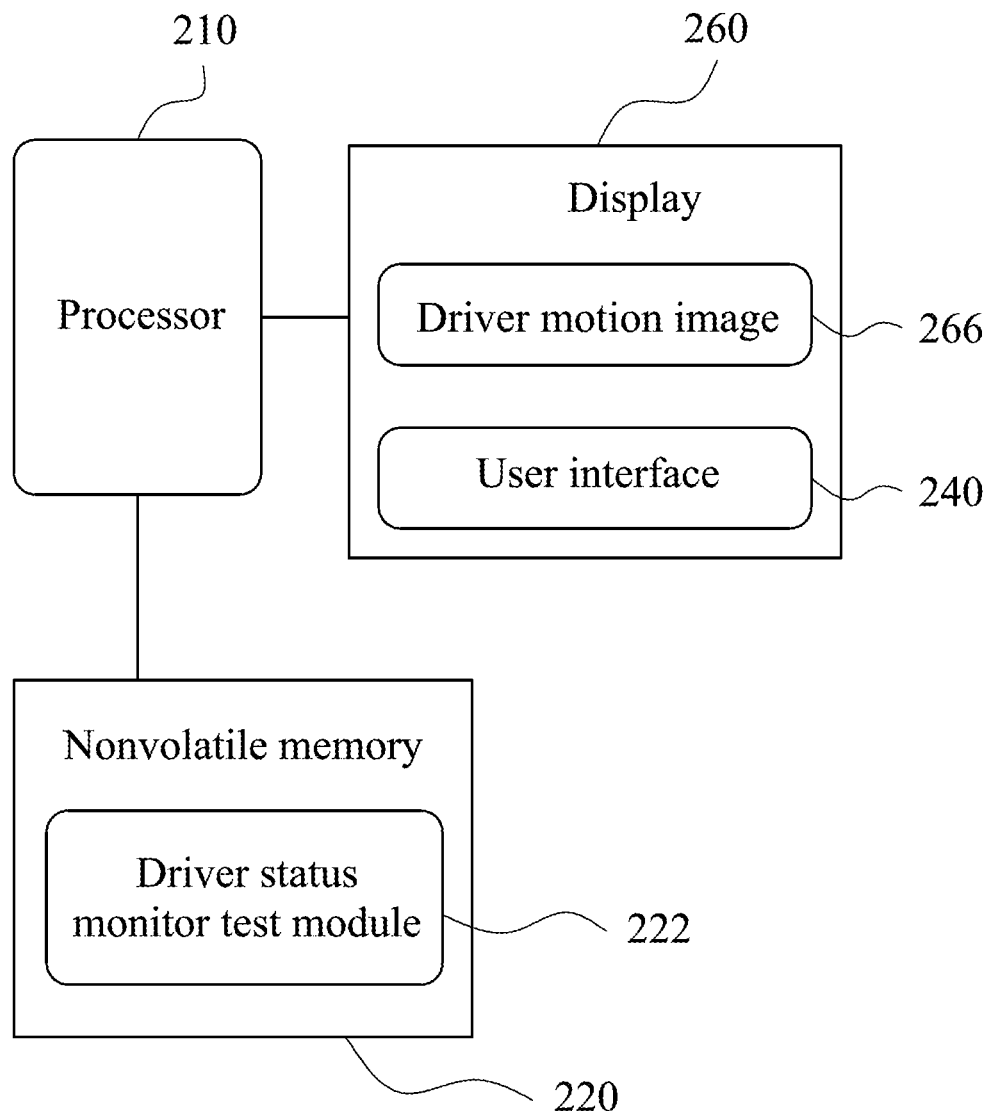
FIG. 2A is a block diagram of a driver status monitor test system according to the 2nd embodiment of the present disclosure.
Figure 2B:
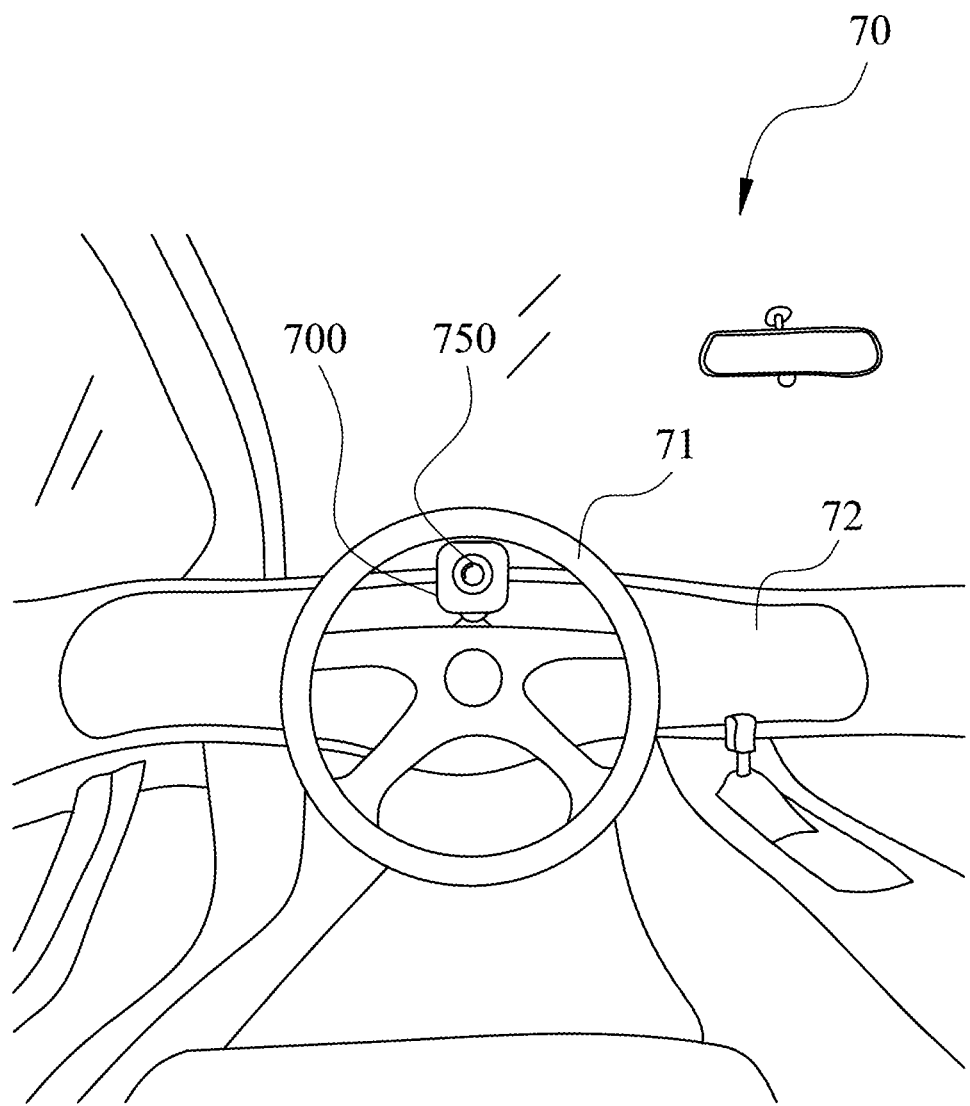
FIG. 2B is a configuration diagram of a driver status monitor under test in the 2nd embodiment.
Figure 2C:
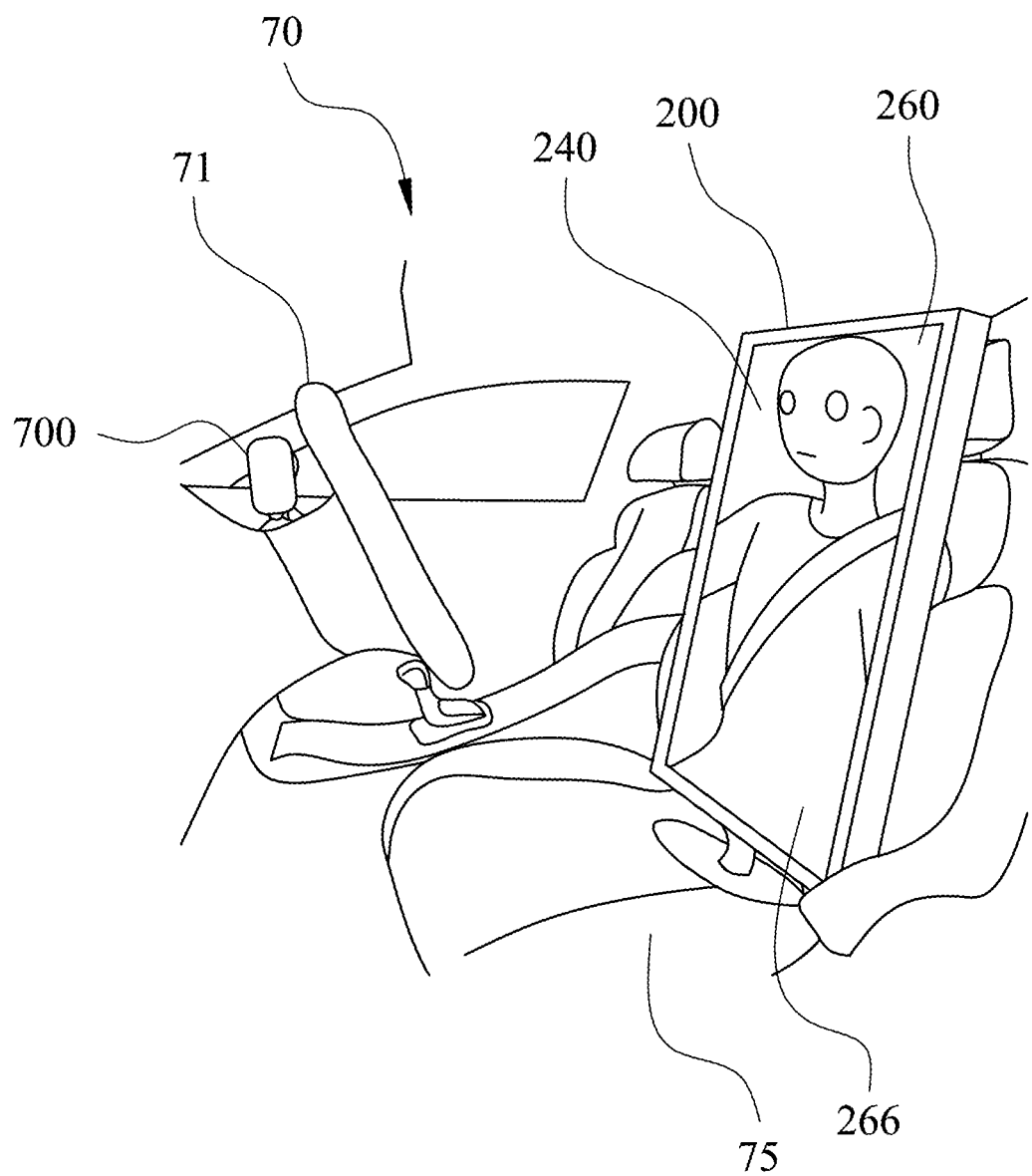
FIG. 2C is a configuration diagram of the driver status monitor test system according to the 2nd embodiment.

FIG. 1 is a flow chart of a driver status monitor test method 100 according to the 1st embodiment of the present disclosure. FIG. 2A is a block diagram of a driver status monitor test system 200 according to the 2nd embodiment of the present disclosure. FIG. 2B is a configuration diagram (i.e., a set-up diagram) of a driver status monitor 700 under test in the 2nd embodiment. FIG. 2C is a configuration diagram of the driver status monitor test system 200 according to the 2nd embodiment. In FIG. 1 to FIG. 2C, the driver status monitor test method 100 according to the 1st embodiment is described with an aid of the driver status monitor test system 200 according to the 2nd embodiment of the present disclosure. The driver status monitor test method 100 is a test method for the driver status monitor 700, and is for testing or verifying if the driver status monitor 700 generates an alarm operation in accordance with driver motion images 266. A photographing unit 750 of the driver status monitor 700 is configured to aim at and take photographs or a video of the driver motion images 266. The driver status monitor test method 100 includes a test motion selecting step 110 and a driver motion image displaying step 150. Furthermore, by the driver status monitor test method 100, the driver status monitor 700 can be predicted if generating an alarm operation in accordance with an abnormal driving behavior (i.e., a dangerous driving behavior, motion, or status) during road driving. That is, a test result of the driver status monitor test method 100 for the driver status monitor 700 is relevant to an ability of generating an alarm operation in accordance with an abnormal driving behavior during road driving of the driver status monitor 700. Moreover, any real test personnel is not employed to perform the test motions in the driver status monitor test method 100. The driver motion images 266 may be three-dimensional modeling images or a three-dimensional modeling video, which are predetermined, a real test personnel video or images being recorded and post-produced, or a prerecorded or real-time video or images of a real test personnel, but not limited thereto.

The test motion selecting step 110 includes selecting at least one test motion for testing the driver status monitor 700 by a user interface 240. The driver motion image displaying step 150 includes displaying the driver motion images 266 by a display 260. The driver motion images 266 are or include a plurality of predetermined image frames in accordance with the test motion. The driver motion images 266 include at least one of a face image, a forelimb image and a torso image. Furthermore, the driver motion images 266 form a video, a motion image sequence, a dynamic image, or continuous images in time domain.

Based on the statements in the aforementioned paragraph, the driver status monitor test method 100 is mainly for detecting an inattentive driving behavior of a driver, e.g., closing eyes, turning the eyesight, turning the head, looking down, checking the mobile phone, smoking, etc. For a conventional driver status monitor test method, the test personnel is employed to perform the test motions. Thus, the conventional driver status monitor test method requires a large manpower and consumes the test time, and results in a low test consistency due to differences of the test motion performed by different test personnel. On the contrary, the driver status monitor test method 100 according to the present disclosure being to display the driver motion images 266 by the display 260 is advantageous in effectively reducing the test manpower and time, and increasing the test consistency. Moreover, the driver status monitor test method 100 according to the present disclosure is beneficial to be applied in product development and verification test, which may be via the test personnel's observation and record, for testing or verifying if the driver status monitor 700 generates the alarm operation in accordance with the driver motion images 266. When the driver status monitor test is introduced to a regulation, a standard, or an OEM's (e.g., a car maker's) specification, it is favorable for increasing the test efficiency and convenience.

In FIG. 2B and FIG. 2C, the test for the driver status monitor 700 may be performed in a real or simulated driving environment 70. The environment 70 may include a dashboard 72, a steering wheel 71, a driver seat 75, a seat belt (not shown in drawings) and a background behind the driver seat 75. The display 260 is disposed on the driver seat 75. The driver status monitor 700 is disposed on a connection portion of the steering wheel 71. The photographing unit 750 of the driver status monitor 700 is configured to aim at and take photographs or a video of the driver motion images 266 shown on the display 260.

In FIG. 1 to FIG. 2C, the driver status monitor test system 200 according to the 2nd embodiment is described with an aid of the driver status monitor test method 100 according to the 1st embodiment of the present disclosure. The driver status monitor test system 200 is for testing if the driver status monitor 700 generates the alarm operation in accordance with the driver motion images 266. The photographing unit 750 of the driver status monitor 700 is configured to aim at and take photographs or a video of the driver motion images 266. The driver status monitor test system 200 includes the display 260, a processor 210 and a nonvolatile memory 220, which is a non-transitory computer-readable memory or storage media. The driver status monitor test system 200 also includes the user interface 240, which is specifically a touch screen (i.e., a touch-sensitive surface) of the display 260.

The processor 210 is coupled (i.e., communicatively or electrically connected) to the user interface 240 and the display 260. The nonvolatile memory 220 is coupled to the processer 210 and configured to provide a driver status monitor test module 222. The processor 210 in accordance with the driver status monitor test module 222 is configured to select the at least one test motion for testing the driver status monitor 700 by the user interface 240, i.e., perform the test motion selecting step 110. The processor 210 in accordance with the driver status monitor test module 222 is also configured to display the driver motion images 266 by the display 260. The driver motion images 266 are or include the plurality of predetermined image frames in accordance with the test motion. The driver motion images 266 include at least one of the face image, the forelimb image and the torso image. That is, it is to perform the driver motion image displaying step 150. Accordingly, the driver status monitor test system 200 according to the present disclosure being to display the driver motion images 266 by the display 260 is effectively reducing the test manpower and time, and enhancing the standardization, reproducibility and repeatability of the test procedure.

In the 2nd embodiment, the driver status monitor test system 200 is specifically an all-in-one device that includes the display 260. The processor 210 and the nonvolatile memory 220 are disposed inside the all-in-one device (i.e., the driver status monitor test system 200). The display 260 has the displaying and inputting functions, and the user interface 240 is the touch screen of the display 260.

Figure 3:
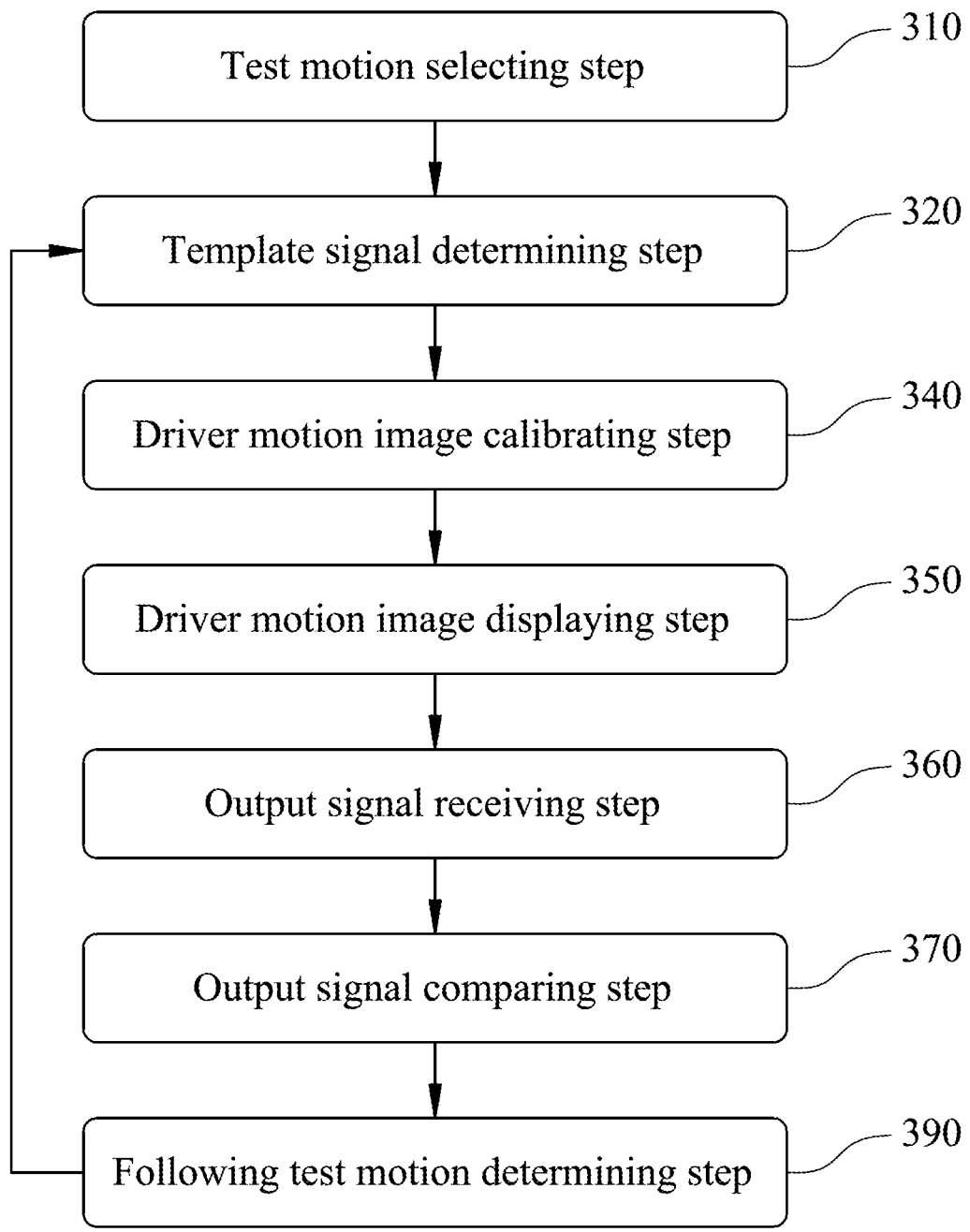
FIG. 3 is a flow chart of a driver status monitor test method according to the 3rd embodiment of the present disclosure.
Figure 4A:
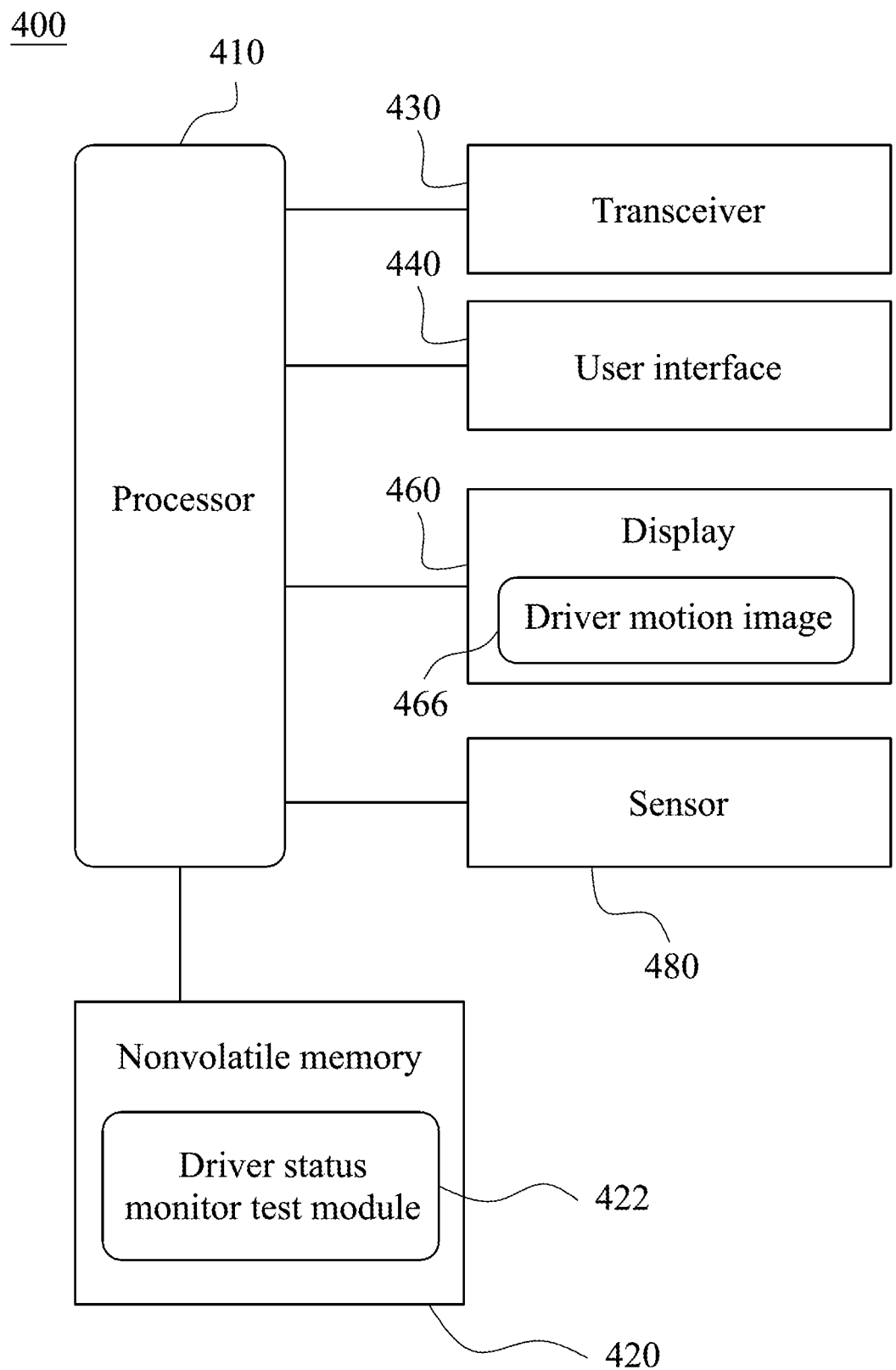
FIG. 4A is a block diagram of a driver status monitor test system according to the 4th embodiment of the present disclosure.
Figure 4B:
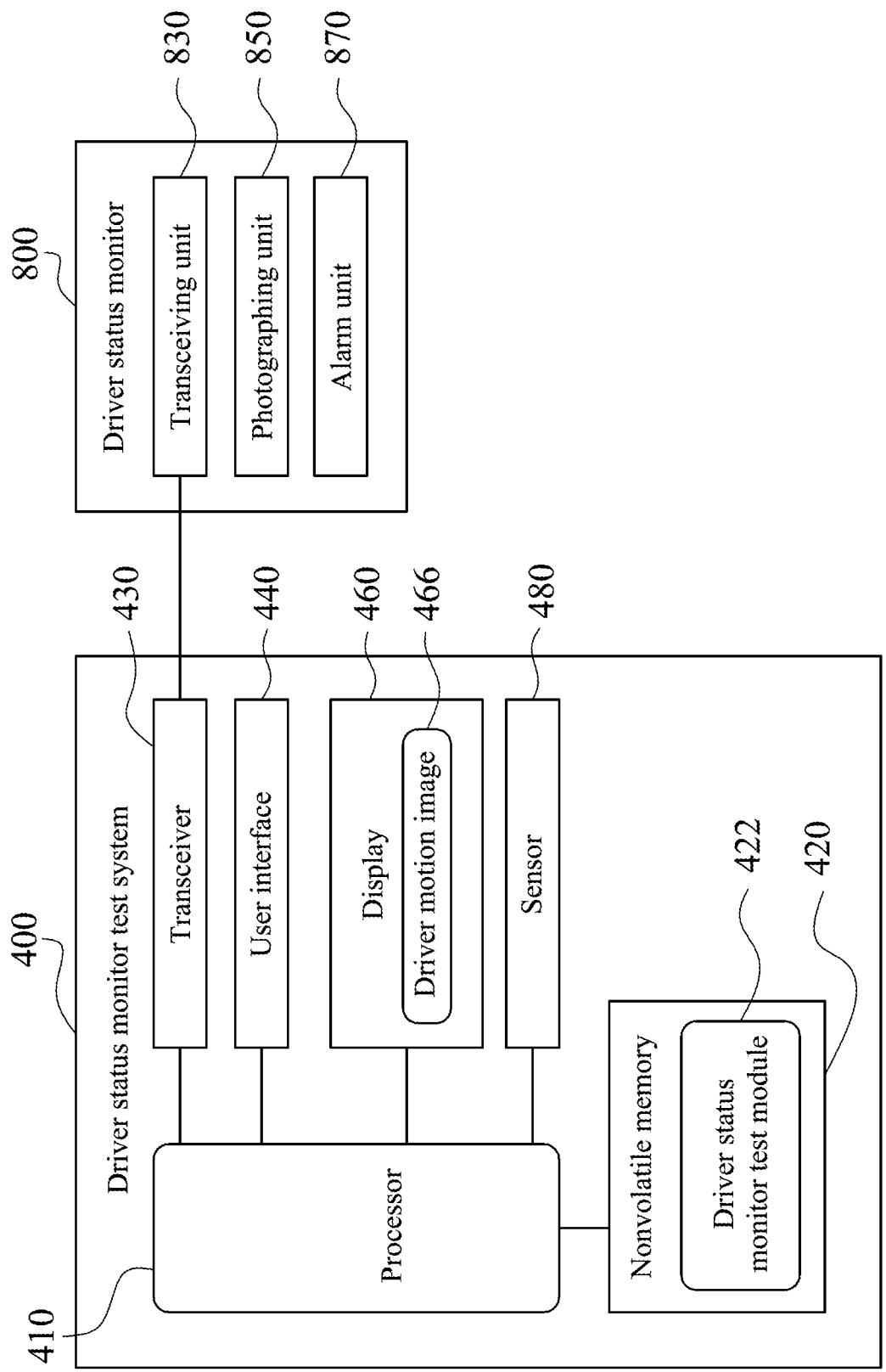
FIG. 4B is a configuration block diagram of the driver status monitor test system and a driver status monitor under test in the 4th embodiment.
Figure 4C:
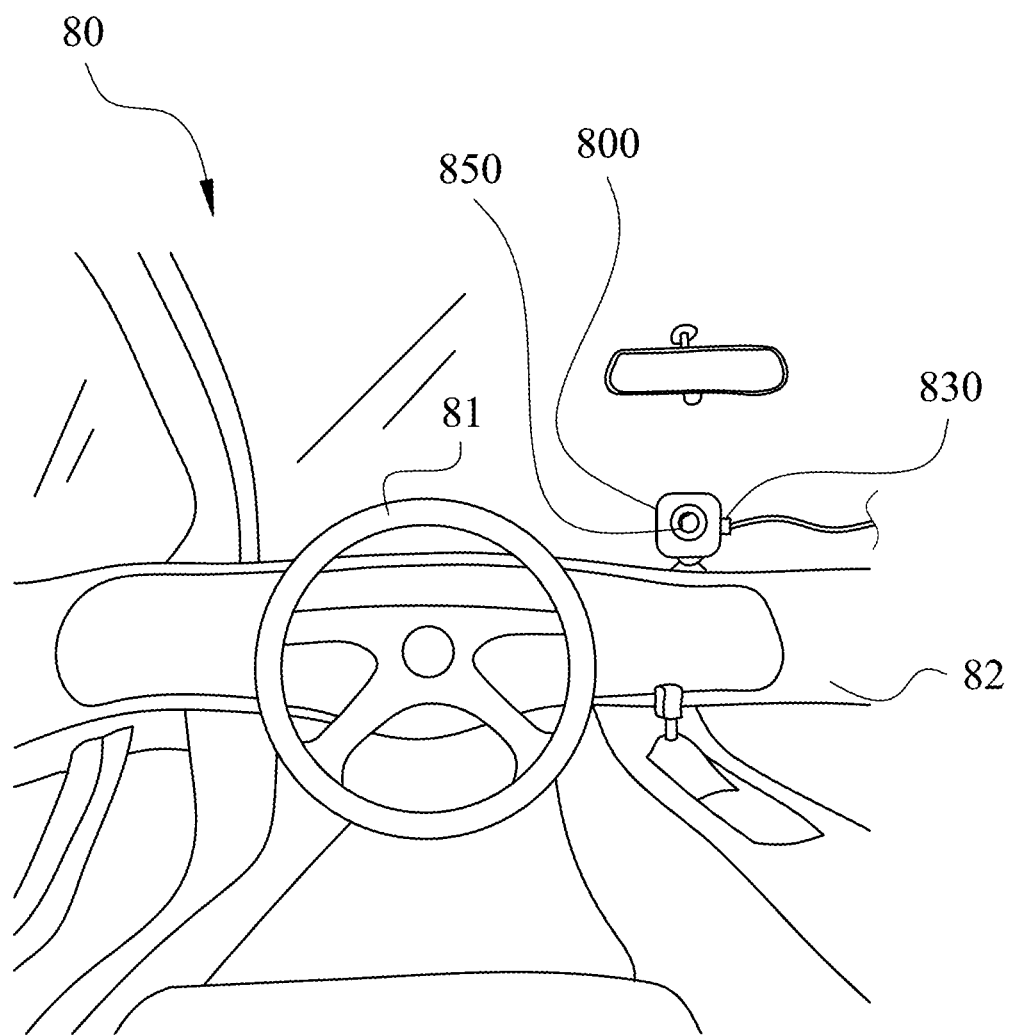
FIG. 4C is a configuration diagram of the driver status monitor under test in the 4th embodiment.
Figure 4D:
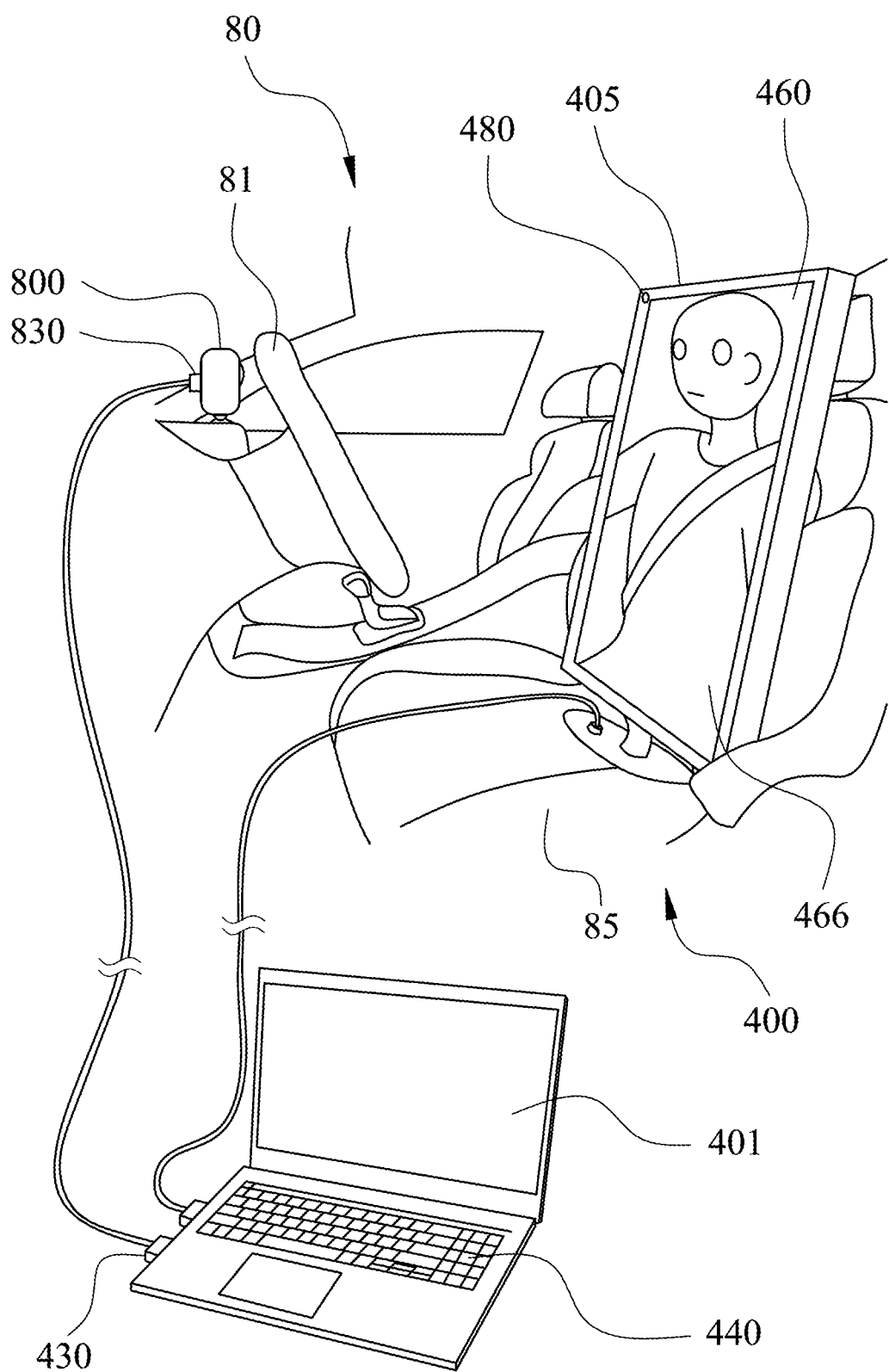
FIG. 4D is a configuration diagram of the driver status monitor test system according to the 4th embodiment.

FIG. 3 is a flow chart of a driver status monitor test method 300 according to the 3rd embodiment of the present disclosure. FIG. 4A is a block diagram of a driver status monitor test system 400 according to the 4th embodiment of the present disclosure. FIG. 4B is a configuration block diagram of the driver status monitor test system 400 and a driver status monitor 800 under test in the 4th embodiment. FIG. 4C is a configuration diagram of the driver status monitor 800 under test in the 4th embodiment. FIG. 4D is a configuration diagram of the driver status monitor test system 400 according to the 4th embodiment. In FIG. 3 to FIG. 4D, the driver status monitor test method 300 according to the 3rd embodiment is described with an aid of the driver status monitor test system 400 according to the 4th embodiment of the present disclosure. The driver status monitor test method 300 is a test method for the driver status monitor 800, and is for testing or verifying if the driver status monitor 800 generates an alarm operation in accordance with driver motion images 466. A photographing unit 850 of the driver status monitor 800 is configured to aim at and take photographs or a video of the driver motion images 466. The driver status monitor test method 300 includes a test motion selecting step 310 and a driver motion image displaying step 350.

The test motion selecting step 310 includes selecting at least one test motion for testing the driver status monitor 800 by a user interface 440 of the driver status monitor test system 400. The driver motion image displaying step 350 includes displaying the driver motion images 466 by a display 460 of driver status monitor test system 400. The driver motion images 466 are or include a plurality of predetermined image frames in accordance with the test motion. The driver motion images 466 include at least one of a face image, a forelimb image and a torso image.

In FIG. 4C and FIG. 4D, the test for the driver status monitor 800 may be performed in a real or simulated driving environment 80. The environment 80 may include a dashboard 82, a steering wheel 81, a driver seat 85, a seat belt (not shown in drawings) and a background behind the driver seat 85. The display 460 is disposed on the driver seat 85. The driver status monitor 800 is disposed on a central portion of a top of the dashboard 82. The photographing unit 850 of the driver status monitor 800 is configured to aim at and take photographs or a video of the driver motion images 466 shown on the display 460.

More detailed, in FIG. 3 to FIG. 4D, the driver motion images 466 are or include predetermined three-dimensional modeling images. Therefore, it is advantageous in establishing the adjustable and modulable driver motion images 466.

The driver motion images 466 are established in accordance with at least one model of a driver model, a driver wearing model, a motion model, a cabin model, a lighting model and a camera model, and the display 460 is a true color display i.e., has the sufficient resolution and color realism. Accordingly, it is beneficial to establish the adjustable and various driver motion images 466. In addition, the driver motion images 466 may include images of a dashboard, a steering wheel, a driver seat, a seat belt and a background behind the driver seat.

The at least one model of the driver model, the driver wearing model, the motion model, the cabin model, the lighting model and the camera model, which is for establishing the driver motion images 466, includes at least one variable condition. Accordingly, it is favorable for implementing the diversity of the driver motion images 466. For example, the variable condition is an adjustable condition or a selectable condition. In the test motion selecting step 310, the test motion for testing the driver status monitor 800, along with the driver motion images 466 predetermined in accordance with the test motion are selected via the user interface 440. In detail, one of a plurality of choices within a variable condition of the driver model may be selected, one of a plurality of choices within a variable condition of the driver wearing model may be selected, one of a plurality of choices within a variable condition of the motion model may be selected, one of a plurality of choices within a variable condition of the cabin model may be selected, one of a plurality of choices within a variable condition of the lighting model may be selected, one of a plurality of choices within a variable condition of the camera model may be selected, and the driver motion images 466 are formed according to the aforementioned selected choices.

More detailed, when the at least one model is the driver model, the at least one variable condition is at least one of a race, a gender and a hairstyle. That is, the driver model includes at least one variable condition related to at least one of the race, the gender and the hairstyle. Accordingly, it is beneficial to perform the test of the driver diversity (i.e., the test sample diversity). Specifically, the at least one variable condition of the race may be implemented by the features related to a skin color, a hair color and eyes.

When the at least one model is the driver wearing model, the at least one variable condition is at least one of eyeglasses and a hat. Accordingly, it is beneficial to implement the driver wearing diversity of the driver motion images 466. Specifically, the variable conditions of the driver wearing model may include the eyeglasses, sunglasses, the hat and a mask.

When the at least one model is the motion model, the at least one variable condition is at least one of a facial expression (e.g., an eye, a mouth, etc.), a head joint, a hand joint and a hand accessory (e.g., a cigarette, a mobile phone, etc.). Accordingly, it is beneficial to implement the test motion diversity of the driver motion images 466. Specifically, the variable conditions may be combined or cooperated to correspond to the test motions of closing eyes, yawning, turning a head left or right, heading up, heading down, smoking, holding the mobile phone adjacent to an ear, handing off a steering wheel, leaving a driver seat, and being unsecured by a seat belt, covering the photographing unit 850, etc.

When the at least one model is the cabin model, the at least one variable condition is at least one of an interior and a window. Accordingly, it is beneficial to perform the test of the cabin diversity (i.e., vehicle type diversity). Specifically, the cabin model may include at least one variable condition of the interior and the window of vehicles of Categories M, N and O. A vehicle of Category M has at least four wheels and is used for the carriage of passengers. A vehicle of Category N has at least four wheels and is used for the carriage of goods. A vehicle of Category O is a trailer (including a semi-trailer).

When the at least one model is the lighting model, the at least one variable condition is at least one of a lighting source type and a lighting luminance. Accordingly, it is beneficial to implement the lighting diversity of the driver motion images 466. Specifically, the variable condition of the lighting source type may include three choices, which are a distant light source, a point light source, and an overall environmental light source. The distant light source is for simulating the parallel light emitted from the sun. For the distant light source, the ground plane is taken as a reference plane, and a right direction of the driver is taken as a light direction of zero degree. A light direction can be selected from a backlight range of 85 to 95 degrees, a forward light range of 265 to 275 degrees, a right light range of −85 to 85 degrees and a left light range of 95 to 265 degrees. A three-dimensional angle of the distant light source can be selected, and a shadow is generated according to the light direction and the three-dimensional angle. The point light source is for simulating the light source not from the sun, e.g., a night scene, etc. A light direction, a distance, and a three-dimensional angle of the point light source can be selected, and a shadow is generated according to the light direction and the three-dimensional angle. Moreover, the overall environmental light source may be a multiple environmental light source being selectable or definable.

When the at least one model is the camera model, the at least one variable condition is at least one of a disposing position (e.g., a top surface of a dashboard, a connection portion of a steering wheel, a ceiling, etc.), a disposing angle and a camera specification (e.g., a vertical angle, a horizontal angle, a focal length, etc.). Accordingly, it is advantageous in avoiding the excessive manpower and test time, which are resulted from the test personnel required to repeat the test motions of different disposing positions of the driver status monitors or cameras thereof in the conventional driver status monitor test method. Further, it is also advantageous in performing the test of the camera diversity.

In addition, in a procedure of establishing the predetermined driver motion images 466, it may start from establishing the driver model, the driver wearing model and the cabin model, continue with establishing the motion model and the lighting model (i.e., establishing standard continuous motion images), and further continue with establishing the camera model.

In FIG. 3, the driver status monitor test method 300 further includes a driver motion image calibrating step 340, which includes providing an environmental information of the display 460 by a sensor 480 to calibrate at least one partial image of the driver motion images 466, and the at least one partial image is corresponding to at least one model of the cabin model, the lighting model and the camera model. Therefore, the driver motion images 466 can more approach real test personnel performing the test motions. Furthermore, the sensor 480 may be a photographing unit, an infrared distance measuring unit, etc., but not limited thereto.

In FIG. 3, FIG. 4B and FIG. 4D, the driver status monitor test method 300 further includes an output signal receiving step 360, which includes receiving an output signal outputted from the driver status monitor 800 by a transceiver 430 of the driver status monitor test system 400, and the output signal is for driving an alarm unit 870. Therefore, the driver status monitor test method 300 can be featured with automatic verification and analysis functions. That is, it is not required a test personnel to observe and record if the driver status monitor 800 generates the alarm operation.

In the 3rd embodiment, the output signal is a CAN (Controller Area Network)-bus signal. Accordingly, the communication protocol of the commercial operation mode of the driver status monitor 800 being employed in the driver status monitor test method 300 is advantageous in reducing the complexity to set as a test mode of the driver status monitor 800. In another embodiment according to the present disclosure, the output signal may be a LIN (Local Interconnect Network)-bus signal or other bus signal.

In FIG. 3, the driver status monitor test method 300 further includes a template signal determining step 320 and an output signal comparing step 370. The template signal determining step 320 includes determining a template signal in accordance with the driver status monitor 800 and the test motion. The output signal comparing step 370 includes comparing the output signal and the template signal in a predetermined delay time to generate a signal comparison result. Accordingly, the driver status monitor test method 300 according to the present disclosure can be featured with automatic verification and analysis functions. That is, the alarm function responding for the abnormal driving behavior of the driver status monitor 800 can be verified by automatic comparison or analysis of signals. Further, the analysis related to the detect rate and accuracy can be automatically performed so as to simultaneously increase the standardization and automation.

In the 3rd embodiment, the signal comparison result is a correct result or a false result. The driver status monitor test method 300 further includes a following test motion determining step 390, which includes determining that a second severe index of a following test motion is higher or lower than a first severe index of the test motion in accordance with the signal comparison result, and a user need or a regulation. The user need may be a test for the product development, a standard, an OEM's specification, etc. Accordingly, it is beneficial to reduce the burden of the test personnel, e.g., fine-tuning a specific variable condition of the driver motion images 466 again and again, and simultaneously verify the performance level of identifying the abnormal driving behavior of the driver status monitor 800.

For example, in the test motion selecting step 310, a test motion of closing eyes, which is an abnormal driving behavior, is selected via the user interface 440 for testing the driver status monitor 800. In the later template signal determining step 320, the template signal in accordance with the driver status monitor 800 and the test motion of closing eyes is selected, and the template signal is for driving the alarm unit 870 to generate an alarm voice. In the driver motion image displaying step 350 after the driver motion image calibrating step 340, the driver motion images 466 of the test motion of closing eyes is displayed by the display 460 of the driver status monitor test system 400. The driver motion images 466 are three-dimensional modeling images or a three-dimensional modeling video. The variable conditions may include a closing degree of closing eyes and a duration of closing eyes of the facial expression of the motion model. In the output signal receiving step 360, the output signal outputted from the driver status monitor 800 is received by the transceiver 430 of the driver status monitor test system 400, and the output signal is for driving the alarm unit 870. In the later output signal comparing step 370 and following test motion determining step 390, the signal comparison result is generated from comparing the output signal and the template signal in the predetermined delay time. When the signal comparison result is a correct result, the second severe index of the following test motion may be higher than the first severe index of the test motion. When the signal comparison result is a false result, the second severe index of the following test motion may be lower than the first severe index of the test motion. Specifically, a severe index of the test motion of closing eyes can be defined by the closing degree of closing eyes and the duration of closing eyes. The more open the eyes are and the shorter the duration is, the higher the severe index of the test motion of closing eyes may be. That is, the closer the eyes are and the longer the duration is, the lower the severe index of the test motion of closing eyes may be.

In FIG. 3 to FIG. 4D, the driver status monitor test system 400 according to the 4th embodiment is described with an aid of the driver status monitor test method 300 according to the 3rd embodiment of the present disclosure. The driver status monitor test system 400 is for testing if the driver status monitor 800 generates the alarm operation in accordance with the driver motion images 466. The photographing unit 850 of the driver status monitor 800 is configured to aim at and take photographs or a video of the driver motion images 466. The driver status monitor test system 400 includes the user interface 440 (e.g., a keyboard, specifically), the display 460, a processor 410 and a nonvolatile memory 420.

The processor 410 is coupled to the user interface 440 and the display 460. The nonvolatile memory 420 is coupled to the processer 410 and configured to provide a driver status monitor test module 422. The processor 410 in accordance with the driver status monitor test module 422 is configured to select the at least one test motion for testing the driver status monitor 800 by the user interface 440, i.e., perform the test motion selecting step 310. The processor 410 in accordance with the driver status monitor test module 422 is also configured to display the driver motion images 466 by the display 460. The driver motion images 466 are or include the plurality of predetermined image frames in accordance with the test motion. The driver motion images 466 include at least one of the face image, the forelimb image and the torso image. That is, it is to perform the driver motion image displaying step 350.

In detail, the processor 410 in accordance with the driver status monitor test module 422 is configured to determine the template signal in accordance with the driver status monitor 800 and the test motion, i.e., perform the template signal determining step 320.

In FIG. 4A, FIG. 4B and FIG. 4D, the driver status monitor test system 400 further includes the sensor 480, which is coupled to the processor 410. The processor 410 in accordance with the driver status monitor test module 422 is configured to provide the environmental information of the display 460 by the sensor 480 to calibrate at least one partial image of the driver motion images 466, and the at least one partial image is corresponding to at least one model of the cabin model, the lighting model and the camera model. That is, it is to perform the driver motion image calibrating step 340. Therefore, the driver motion images 466 can more approach real test personnel performing the test motions.

The driver status monitor test system 400 further includes the transceiver 430, which is coupled to the processor 410. The processor 410 in accordance with the driver status monitor test module 422 is configured to, by the transceiver 430, receive the output signal outputted from a transceiving unit 830 of the driver status monitor 800, and the output signal is for driving the alarm unit 870 of the driver status monitor 800. That is, it is to perform the output signal receiving step 360. Therefore, the driver status monitor test system 400 can be featured with automatic verification and analysis functions. In the 4th or another embodiment according to the present disclosure, the alarm unit 870 may be disposed on the driver status monitor 800 or equipped on the vehicle. The alarm unit 870 may be at least one of a sound unit, a lighting unit and a vibration unit.

Furthermore, the processor 410 in accordance with the driver status monitor test module 422 is configured to compare the output signal and the template signal in the predetermined delay time to generate the signal comparison result, i.e., perform the output signal comparing step 370.

The processor 410 in accordance with the driver status monitor test module 422 is configured to determine that the second severe index of the following test motion is higher or lower than the first severe index of the test motion in accordance with the signal comparison result, and the user need or the regulation, i.e., perform the following test motion determining step 390.

In the 4th embodiment, the driver status monitor test system 400 specifically includes a displaying unit 405 and a control computer 401. The displaying unit 405 includes the display 460 and the sensor 480. The control computer 401 includes the processor 410, the nonvolatile memory 420, the transceiver 430 and the user interface 440. The transceiver 430 is coupled to the transceiving unit 830 of the driver status monitor 800 in a wired manner. In addition, the driver status monitor 800 may further include a processor (not shown in drawings) and a nonvolatile memory (not shown in drawings) for setting the driver status monitor 800 in the commercial operation mode or the test mode.

The contents related to the driver status monitor test method 300 according to the 3rd embodiment may be referred for the other details of the driver status monitor test system 400 according to the 4th embodiment, which are thereby not described herein.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A driver status monitor test method, comprising:
   a test motion selecting step comprising selecting at least one test motion for testing the driver status monitor by a user interface, wherein the driver status monitor test method is for testing if the driver status monitor generates an alarm operation in accordance with driver motion images, and a photographing unit of the driver status monitor configured to take photographs of the driver motion images; and
   a driver motion image displaying step comprising displaying the driver motion images by a display, wherein the driver motion images are a plurality of predetermined image frames in accordance with the test motion, the driver motion images comprise at least one of a face image, a forelimb image and a torso image, the display is located on a driver seat of a vehicle, and the photographing unit of the driver status monitor is located in front of the display on the vehicle.

2. The driver status monitor test method of claim 1, wherein the driver motion images are images based on three-dimensional modeling.

3. The driver status monitor test method of claim 2, wherein the driver motion images are established in accordance with at least one model of a driver model, a driver wearing model, a motion model, a cabin model, a lighting model and a camera model, and the display is a true color display.

4. The driver status monitor test method of claim 3, wherein the at least one model comprises at least one variable condition;
   wherein when the at least one model is the driver model, the at least one variable condition is at least one of a race, a gender and a hairstyle;
   wherein when the at least one model is the driver wearing model, the at least one variable condition is at least one of eyeglasses and a hat;
   wherein when the at least one model is the motion model, the at least one variable condition is at least one of a facial expression, a head joint, a hand joint and a hand accessory;
   wherein when the at least one model is the cabin model, the at least one variable condition is at least one of an interior and a window;
   wherein when the at least one model is the lighting model, the at least one variable condition is at least one of a lighting source type and a lighting luminance;
   wherein when the at least one model is the camera model, the at least one variable condition is at least one of a disposing position, a disposing angle and a camera specification.

5. The driver status monitor test method of claim 3, further comprising:
   a driver motion image calibrating step comprising providing an environmental information of the display by a sensor to calibrate at least one partial image of the driver motion images, wherein the at least one partial image is corresponding to at least one model of the cabin model, the lighting model and the camera model.

6. The driver status monitor test method of claim 1, further comprising:

an output signal receiving step comprising receiving an output signal outputted from the driver status monitor by a transceiver, wherein the output signal is for driving an alarm unit.

7. The driver status monitor test method of claim 6, wherein the output signal is a CAN-bus signal.

8. The driver status monitor test method of claim 6, further comprising:
a template signal determining step comprising determining a template signal in accordance with the driver status monitor and the test motion; and
an output signal comparing step comprising comparing the output signal and the template signal in a predetermined delay time to generate a signal comparison result.

9. The driver status monitor test method of claim 8, wherein the signal comparison result is a correct result or a false result, and the driver status monitor test method further comprises:
a following test motion determining step comprising determining that a second severe index of a following test motion is higher or lower than a first severe index of the test motion in accordance with the signal comparison result, and a user need or a regulation.

10. A driver status monitor test system, comprising:
a user interface;
a display located on a driver seat of a vehicle;
a processor coupled to the user interface and the display; and
a nonvolatile memory coupled to the processor and configured to provide a driver status monitor test module;
wherein the driver status monitor test system is for testing if a driver status monitor generates an alarm operation in accordance with driver motion images, a photographing unit of the driver status monitor is located in front of the display on the vehicle and configured to take photographs of the driver motion images, and the processor in accordance with the driver status monitor test module is configured to:
select at least one test motion for testing the driver status monitor by the user interface; and
display the driver motion images by the display, wherein the driver motion images are a plurality of predetermined image frames in accordance with the test motion, and the driver motion images comprise at least one of a face image, a forelimb image and a torso image.

11. The driver status monitor test system of claim 10, wherein the driver motion images are images based on three-dimensional modeling.

12. The driver status monitor test system of claim 11, wherein the driver motion images are established in accordance with at least one model of a driver model, a driver wearing model, a motion model, a cabin model, a lighting model and a camera model, and the display is a true color display.

13. The driver status monitor test system of claim 12, wherein the at least one model comprises at least one variable condition;
wherein when the at least one model is the driver model, the at least one variable condition is at least one of a race, a gender and a hairstyle;
wherein when the at least one model is the driver wearing model, the at least one variable condition is at least one of eyeglasses and a hat;
wherein when the at least one model is the motion model, the at least one variable condition is at least one of a facial expression, a head joint, a hand joint and a hand accessory;
wherein when the at least one model is the cabin model, the at least one variable condition is at least one of an interior and a window;
wherein when the at least one model is the lighting model, the at least one variable condition is at least one of a lighting source type and a lighting luminance;
wherein when the at least one model is the camera model, the at least one variable condition is at least one of a disposing position, a disposing angle and a camera specification.

14. The driver status monitor test system of claim 12, further comprising:
a sensor coupled to the processor;
wherein the processor in accordance with the driver status monitor test module is configured to provide an environmental information of the display by the sensor to calibrate at least one partial image of the driver motion images, and the at least one partial image is corresponding to at least one model of the cabin model, the lighting model and the camera model.

15. The driver status monitor test system of claim 10, further comprising:
a transceiver coupled to the processor;
wherein the processor in accordance with the driver status monitor test module is configured to receive an output signal outputted from the driver status monitor by the transceiver, and the output signal is for driving an alarm unit.

16. The driver status monitor test system of claim 15, wherein the output signal is a CAN-bus signal.

17. The driver status monitor test system of claim 15, wherein the processor in accordance with the driver status monitor test module is configured to determine a template signal in accordance with the driver status monitor and the test motion, and compare the output signal and the template signal in a predetermined delay time to generate a signal comparison result.

18. The driver status monitor test system of claim 17, wherein the signal comparison result is a correct result or a false result, and the processor in accordance with the driver status monitor test module is configured to determine that a second severe index of a following test motion is higher or lower than a first severe index of the test motion in accordance with the signal comparison result, and a user need or a regulation.

19. A driver status monitor test system configured to test an external driver status monitor which is external to the driver status monitor test system, the driver status monitor including a monitor transceiving unit, a monitor photographing unit, and a monitor alarm unit, the driver status monitor test system comprising:
a test system transceiver;
a display located on a driver seat of a vehicle, wherein the monitor photographing unit is located in front of the display on the vehicle;
a nonvolatile memory configured to provide a driver status monitor test module;
a processor coupled to the test system transceiver, the display, and the nonvolatile memory, wherein the processor, in accordance with the driver status monitor test module, is configured to perform steps of a driver status monitor test method comprising:

selecting at least one test motion for testing the driver status monitor;

displaying driver motion images on the display, wherein the driver motion images are a plurality of image frames in accordance with the test motion, and the driver motion images comprise at least one of a face image, a forelimb image, and a torso image;

receiving an output signal outputted by the monitor transceiving unit of the driver status monitor through the test system transceiver, wherein the output signal is for driving the monitor alarm unit of the driver status monitor in response to the monitor photographing unit obtaining photographs or a video of the driver motion images and the driver status monitor determining to drive the monitor alarm unit according to the photographs or the video of the driver motion images;

determining a template signal in accordance with the test motion; and comparing the output signal and the template signal to generate a signal comparison result and to thereby verify an alarm function of the driver status monitor for responding to abnormal driving behavior.

20. The driver status monitor test system of claim 19, further comprising a wire, wherein the test system transceiver is coupled to the monitor transceiving unit through the wire.

* * * * *